US012340641B2

(12) United States Patent
Aity et al.

(10) Patent No.: US 12,340,641 B2
(45) Date of Patent: Jun. 24, 2025

(54) SYSTEM AND METHOD FOR ACTIVATING LOCKBOX WHEN AUTHENTICATING DEVICE IS IN RANGE

(71) Applicant: HONEYWELL INTERNATIONAL INC., Charlotte, NC (US)

(72) Inventors: Rakesh Aity, Telangana (IN); Naga Santosh Ranjith Kumar Gowd Kota, Telangana (IN); Satya Dinesh Munjuluri, Telangana (IN); Sanjeevareddy Neelam, Telangana (IN); Nitheesha Vallurupalli, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 134 days.

(21) Appl. No.: 18/181,769

(22) Filed: Mar. 10, 2023

(65) Prior Publication Data

US 2023/0290202 A1 Sep. 14, 2023

(30) Foreign Application Priority Data

Mar. 10, 2022 (IN) ............................ 202211013071

(51) Int. Cl.
*G07C 9/00* (2020.01)

(52) U.S. Cl.
CPC ..... *G07C 9/00309* (2013.01); *G07C 9/00896* (2013.01); *G07C 2009/00373* (2013.01); *G07C 2009/00642* (2013.01); *G07C 2009/00936* (2013.01)

(58) Field of Classification Search
CPC ........... G07C 9/00309; G07C 9/00896; G07C 2009/00373; G07C 2009/00642; G07C 2009/00936
USPC ........................................................ 340/5.73
See application file for complete search history.

(56) References Cited

U.S. PATENT DOCUMENTS

| | | | | |
|---|---|---|---|---|
| 7,012,503 | B2 * | 3/2006 | Nielsen .................... | G07C 9/27 340/5.6 |
| 8,254,868 | B2 | 8/2012 | Constien et al. | |
| 8,451,088 | B2 | 5/2013 | Fisher | |
| 9,001,801 | B2 | 4/2015 | Hillyard et al. | |
| 9,271,232 | B2 | 2/2016 | Zhang et al. | |
| 9,288,759 | B2 | 3/2016 | Kerai et al. | |
| 9,478,084 | B1 * | 10/2016 | Robinson ................ | G07C 9/38 |
| 9,659,424 | B2 | 5/2017 | Huber | |
| 9,704,319 | B2 | 7/2017 | Desinor, Jr. | |

(Continued)

FOREIGN PATENT DOCUMENTS

| | | | |
|---|---|---|---|
| CA | 2660676 | A1 | 9/2010 |
| CN | 210563866 | U | 5/2020 |

*Primary Examiner* — Nam V Nguyen
(74) *Attorney, Agent, or Firm* — Seager, Tufte & Wickhem, LLP

(57) ABSTRACT

A system and a method for activating a lockbox when authenticating device is in range. One or more data packets are received from a plurality of first devices at a sensor unit. A valid data packet is determined from the one or more data packets. A first device corresponding to the valid data packet is determined from the plurality of first devices. A trigger signal is transmitted to a second device after validating the data packet. The second device is switched ON to transmit and receive communication from the first device based on receiving the trigger signal.

18 Claims, 3 Drawing Sheets

(56) References Cited

U.S. PATENT DOCUMENTS

| | | | | |
|---|---|---|---|---|
| RE46,539 | E | 9/2017 | Fisher | |
| 9,830,760 | B2 | 11/2017 | Fisher | |
| 9,894,066 | B2 * | 2/2018 | Conrad | H04L 67/34 |
| 9,990,791 | B2 | 6/2018 | Firth et al. | |
| 10,030,418 | B2 | 7/2018 | Mcginn et al. | |
| 10,031,575 | B2 | 7/2018 | Meng et al. | |
| 10,042,340 | B2 | 8/2018 | Hofschulz et al. | |
| 10,085,214 | B2 | 9/2018 | Solotke et al. | |
| 10,159,044 | B2 | 12/2018 | Hrabak | |
| 10,225,801 | B2 | 3/2019 | Gosal et al. | |
| 10,244,470 | B2 | 3/2019 | Radhakrishnan et al. | |
| 10,349,354 | B2 | 7/2019 | Kvetny et al. | |
| 10,375,640 | B2 | 8/2019 | Xie et al. | |
| 10,395,452 | B2 | 8/2019 | Morrison et al. | |
| 10,448,327 | B2 | 10/2019 | Prasad et al. | |
| 10,542,497 | B2 * | 1/2020 | Ree | H04W 52/0219 |
| 10,745,943 | B1 | 8/2020 | Jonak et al. | |
| 10,896,560 | B2 * | 1/2021 | Ahearn | G07C 9/22 |
| 11,191,027 | B2 | 11/2021 | Ljung | |
| 11,270,536 | B2 * | 3/2022 | Strömberg | G07C 9/00309 |
| 11,348,396 | B2 * | 5/2022 | Meruva | G07C 9/00309 |
| 11,521,450 | B2 * | 12/2022 | Learmonth | G07C 9/20 |
| 11,948,415 | B2 * | 4/2024 | Pasma | G07C 9/23 |
| 2008/0261560 | A1 * | 10/2008 | Ruckart | G07C 9/257<br>455/411 |
| 2010/0283579 | A1 * | 11/2010 | Kraus | G07C 9/00944<br>340/5.7 |
| 2012/0003932 | A1 | 1/2012 | Zhodzishsky | |
| 2012/0157080 | A1 * | 6/2012 | Metivier | G07C 9/00309<br>455/420 |
| 2013/0221094 | A1 * | 8/2013 | Smith | G07C 9/00309<br>235/382 |
| 2013/0257590 | A1 * | 10/2013 | Kuenzi | G05B 1/01<br>340/5.65 |
| 2014/0049364 | A1 | 2/2014 | Ahearn et al. | |
| 2015/0312862 | A1 | 10/2015 | Pei | |
| 2016/0241999 | A1 * | 8/2016 | Chin | G07C 9/00182 |
| 2022/0014892 | A1 * | 1/2022 | Bengtsson | G06K 7/10237 |

* cited by examiner

SYSTEM AND METHOD FOR ACTIVATING LOCKBOX WHEN AUTHENTICATING DEVICE IS IN RANGE

FOREIGN PRIORITY

This application claims priority to Indian Patent Application No. 202211013071, filed Mar. 10, 2022, and all the benefits accruing therefrom under 35 U.S.C. § 119, the contents of which in its entirety are herein incorporated by reference.

TECHNICAL FIELD OF INVENTION

The present invention generally relates to communication between different wireless devices. More particularly, the invention relates to conserving power when using wireless devices.

BACKGROUND OF THE INVENTION

Various devices communicate wirelessly and generate vast amounts of data. The data is created and updated every moment and therefore requires devices with long battery lives for supporting systems communicating wirelessly to perform the required tasks without frequent charging or replacement of batteries.

For example, in the real estate industry, several properties may be up for sale and may be of interest to prospective home buyers. In most real estate transactions, there are multiple people involved in completing the transaction—from prospective buyer, agents, sellers, to multiple visitors who visit a property of interest. An event of showing a property to a prospective buyer generates an electronic event at a lockbox, such that the relevant agent may access the lockbox to retrieve the key to show the property. The lockboxes may be capable of communicating over short distances using communication technologies, for example—Bluetooth. Different users may visit the property and access the lockbox.

One of the major disadvantages associated with Bluetooth enabled devices is that they use batteries for operation that drain rapidly. In case a Bluetooth connection between devices remains in an ON mode for a long duration, additional power consumption occurs. This type of situation becomes problematic and battery replacement is required in case the battery fails. Therefore, battery life is a major concern in such wireless devices.

Therefore, there is a need in the art to develop system and methods to conserve battery power and also to disable the battery when not in use. There is also a need in the art to reduce the processing time for repetitive triggering of devices for unwanted communication requests from different Bluetooth devices in vicinity.

SUMMARY OF THE INVENTION

The present disclosure presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Various embodiments of the invention describe a method for optimizing energy in battery powered wireless devices when communicating with other devices. The method comprises steps of receiving one or more data packets from a plurality of first devices at a sensor unit. The method also comprises steps of determining a valid data packet from the one or more data packets. The method further comprises the steps of determining a first device corresponding to the valid data packet from the plurality of first devices. The method further comprises steps of transmitting a trigger signal to a second device after validating the data packet. The second device is switched ON to transmit and receive communication from the first device based on receiving the trigger signal.

In an embodiment of the invention, the plurality of first devices, the sensor unit and the second device are communicably coupled with each other.

In another embodiment of the invention, each of the one or more data packets comprises a unique identifier indicating an identity of each of the first devices.

In still another embodiment of the invention, the sensor unit determines the valid data packet by matching the unique identifier of the first device with a prestored unique identifier.

In another embodiment of the invention, the sensor unit transmits the trigger signal and the unique identifier of the first device to the second device on determining the valid data packet.

In yet another embodiment of the invention, the sensor unit transmits the one or more data packets to a cloud, wherein the cloud determines the valid data packet and the corresponding first device by matching the unique identifier of the first device with a prestored unique identifier. The cloud transmits the unique identifier of the first device to the sensor unit, and the sensor unit transmits the trigger signal and the unique identifier of the first device to the second device.

In a different embodiment of the invention, on invalidation of the one or more data packets, no trigger signal is transmitted to the second device.

Various embodiments of the invention describe a system for optimizing energy in battery powered wireless devices when communicating with other devices. The system comprises a plurality of first devices, each configured to transmit a data packet. The system comprises a sensor unit configured to receive one or more data packets from the plurality of first devices and determine a valid data packet from the one or more data packets. The sensor unit is configured to determine a first device corresponding to the valid data packet from the plurality of first devices and transmit a trigger signal after validating the data packet. The system also comprises a second device configured to receive the trigger signal from the sensor unit, wherein the second device is switched ON to transmit and receive communication from the first device based on receiving the trigger signal.

In an embodiment of the invention, the plurality of first devices, the sensor unit and the second device are communicably coupled with each other.

In yet another embodiment of the invention, each of the one or more data packets comprises a unique identifier indicating an identity of each of the first devices.

In still another embodiment of the invention, the sensor unit determines the valid data packet by matching the unique identifier of the first device with a prestored unique identifier.

In different embodiment of the invention, the sensor unit transmits the trigger signal and the unique identifier of the first device to the second device on determining the valid data packet.

In another embodiment of the invention, the sensor unit transmits the one or more data packets to a cloud, wherein the cloud determines the valid data packet and the corresponding first device by matching the unique identifier of the first device with a prestored unique identifier, wherein the cloud transmits the unique identifier of the first device to the sensor unit, and the sensor unit transmits the trigger signal and the unique identifier of the first device to the second device.

In another embodiment of the invention, on invalidation of the one or more data packets, no trigger signal is transmitted to the second device.

Various embodiments of the invention describe a system for optimizing energy in battery powered wireless devices when communicating with other devices. The system comprises a plurality of first devices, each configured to transmit a data packet. The system also comprises a sensor unit configured to transmit each of the one or more data packets to a cloud. The system comprises the cloud configured to receive each of the one or more data packets from the sensor unit. The system also comprises the cloud configured to determine a valid data packet from the one or more data packets. The system further comprises the cloud configured to determine a first device corresponding to the valid data packet from the plurality of first devices. The system comprises the cloud configured to transmit a trigger signal after validating the data packet. The system also comprises a second device configured to receive the trigger signal from the cloud. The second device is switched ON to transmit and receive communication from the first device based on receiving the trigger signal.

In an embodiment of the invention, the plurality of first devices, the sensor unit and the second device are communicably coupled with each other.

In another embodiment of the invention, each of the one or more data packets comprises a unique identifier indicating an identity of each of the first devices.

In another embodiment of the invention, the cloud determines the valid data packet by matching the unique identifier of the first device with a prestored unique identifier.

In yet another embodiment of the invention, the cloud transmits the trigger signal and the unique identifier of the first device to the second device on determining the valid data packet.

Various embodiments of the invention describe a computer readable medium comprising one or more processors and a memory coupled to the one or more processors. Further, the memory stores instructions executed by the one or more processors. The one or more processors are configured to receive one or more data packets from a plurality of first devices at a sensor unit. The one or more processors are configured to determine a valid data packet from the one or more data packets. The one or more processors are configured to determine a first device corresponding to the valid data packet from the plurality of first devices. The one or more processors are configured to transmit a trigger signal to a second device after validating the data packet, wherein the second device is switched ON to transmit and receive communication from the first device based on receiving the trigger signal.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Some of the objects of the invention have been set forth above. These and other objects, features, aspects and advantages of the present invention will become better understood with regard to the following description, appended claims and accompanying drawings where:

Corresponding reference numerals indicate corresponding parts throughout the drawings.

DETAILED DESCRIPTION OF THE INVENTION

Figure 1:
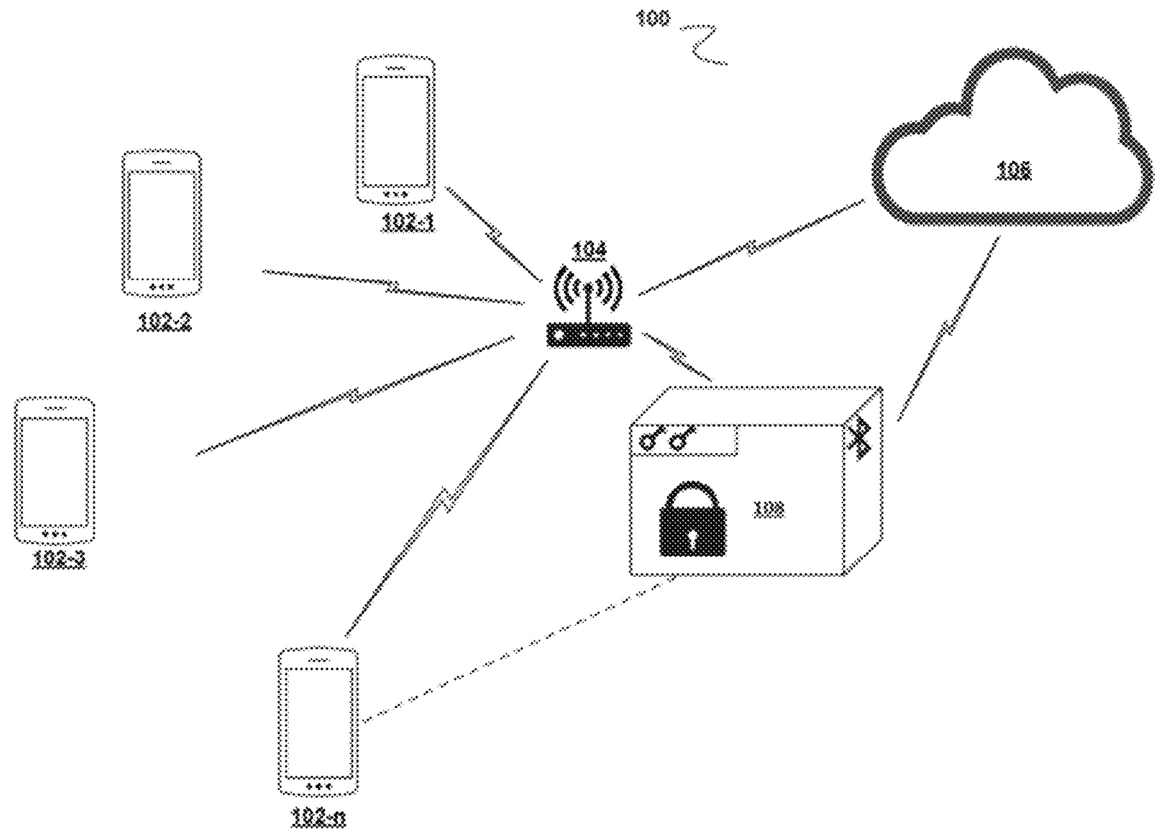
FIG. 1 depicts an exemplary system diagram in accordance with the invention of the present application.

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

Described herein is the technology with a system and a method for optimizing energy in battery powered wireless devices when communicating with other devices within range. One or more data packets are received from a plurality of first devices at a sensor unit. A valid data packet is determined from the one or more data packets. A first device is then determined corresponding to the valid data packet from the plurality of first devices. A trigger signal is transmitted to a second device after validating the data packet. The second device is switched ON to transmit and receive communication from the first device based on receiving the trigger signal.

The embodiments of the invention may be used to optimize energy of battery powered devices. The battery powered devices, for example the second device, may be integrated with the sensor unit and may switch ON only when the incoming data packet is validated at the sensor unit or at a cloud and the second device receives the trigger signal. For remaining period, the second device may remain in a low power mode that may optimize battery consumption as it avoids checking for communication with authorized first device from many devices. By switching ON the second device for a limited period of time only, and on receiving the trigger signal, unnecessary battery usage may be avoided for non-validated Bluetooth devices in vicinity of the second device. Moreover, on receiving triggering signal, the second device establish a communication channel with the first device to transmit and receive signals to and from the first device for a limited duration of time.

As used herein, the first device may be one or more of portable communication devices (sometimes referred as a mobile device, a tablet or a portable transponder or a PDA and the like) that communicates with a second device.

As used herein, the second device may be one or more of electronic key boxes (hereinafter interchangeably called lockbox) which is capable of communicating with the first device and other devices using a short-range communication. The key box may store therein one or more physical keys to access any entrance of premises.

As used herein, a sensor unit may be a low power consumption unit that may communicate with both the first device and the second device. The sensor unit may be configured to receive signals and commands from the wireless devices or wired devices in vicinity.

As used herein, the first device and the second device may communicate amongst themselves and with the sensor unit as well as cloud using short range wireless communication technologies such as Bluetooth, infrared, near field communication, ultra-band, Zigbee etc.

As used herein, the cloud may be a server using which the sensor unit and the second device may communicate using cellular network, Local area network (LAN), Wide area network (WAN) and the like known to a person skilled in the art.

As used herein, the features of the invention disclosed herein may be implemented in software and may be executed using hardware to implement the technology described herein.

FIG. 1 illustrates system 100 in accordance with the invention. In some embodiments, the system 100 comprises a plurality of first devices 102-1, 102-2, 102-3 . . . **102-*n* (together known as 102), a sensor unit 104, a cloud 106 and a second device 108. When one or more first devices 102 come in proximity with the second device 108, the one or more first devices 102 transmit the respective data packet to the sensor unit 104. Each of the data packets transmitted by the plurality of first devices 102 comprises a unique identifier indicating an identity of each of the corresponding first devices 102**.

The sensor unit 104 receives the data packets from the plurality of the first devices 102 and matches the unique identifier in the data packets with prestored unique identifiers in memory of the sensor unit 104. On matching the unique identifier of at least one of the data packets with the prestored unique identifiers at the sensor unit 104, the sensor unit 104 may validate the data packet. The sensor unit may determine the first device from the plurality of first devices **102-*n* corresponding to the valid data packet. Further, on validating the data packet, the sensor unit 104 may generate a trigger signal for the second device 108. The sensor unit 104 may transmit the trigger signal along with the unique identifier of the first device 102 corresponding to the valid data packet to the second device 108**.

The second device 108 operates on battery and consumes energy from the battery. The second device 108 remains in a low power mode or in OFF state by default in order to save the unnecessary power wastage and long lifetime of battery powered device. In a low power mode/OFF state, the second device 108 may only receive limited wireless messages of high criticality such as trigger signal to turn ON the second device 108. For, example, the second device may only receive signals from the sensor unit 104 used to turn ON the second device 108 to start communication. In case, when the second device 108 determines that the trigger signal (along with the unique identifier) is received on the second device 108 from the sensor unit 104, the second device 108 switches ON to establish one to one communication with the first device **102-*n*. The first device 102-*n* may correspond to the first device having the unique identifier of the valid data packet. Thus, the second device 108 may transmit and receive communication from the first device 102 based on the received trigger signal and the unique identifier. Therefore, the second device 108 switches ON for a pre-defined session for communication with the first device 102 and after the session completes, the second device 108** switches back to the low power mode/OFF state.

In another embodiment of the invention, the sensor unit 104 may receive the plurality of data packets from the plurality of first devices 102. The sensor unit 104 may transmit each of the data packets received from the plurality of first devices 102 to a cloud 106. The cloud 106 on receiving the data packets, may match unique identifier in each of the data packets with pre-stored unique identifiers at the cloud 106 for validation. On matching the unique identifier of at least one of the data packets with the prestored unique identifier at the cloud 106, the cloud 106 validates the data packet. Further, the cloud 106 may determine the first device 102 corresponding to the valid data packet. The cloud 106 may transmit the unique identifier, corresponding to the valid data packet, to the sensor unit 104 after validation. Further, on receiving the valid data packet, the sensor unit 104 may generate a trigger signal for the second device 108 such that the second device 108 comes into active mode/ON state and starts communication with other devices. The sensor unit 104 may transmit the trigger signal and the unique identifier of the first device **102-*n* corresponding to the valid data packet to the second device 108. The second device 108, on receiving the trigger signal, switches ON to transmit and receive communication from the first device 102. Moreover, the validation of the data packets may be performed at the cloud 106, due to which the processing, memory and battery of the sensor unit 104 may be saved to a great extent. Further, the second device 108 may remain switched ON for a particular session only on receiving the trigger signal from the sensor device 104. Therefore, the lifetime of battery powered second device may be extended for longer duration and there may not be frequent requirement of changing the second device 108**.

A different embodiment of the invention is described herein, the sensor unit 104 may receive the plurality of data packets from the plurality of first devices 102. The sensor unit 104 may transmit each of the data packets received from the plurality of first devices 102 to a cloud 106. The cloud 106 on receiving the data packets, matches the unique identifier in each of the data packet with prestored unique identifiers at the cloud 106 for validation. On matching the unique identifier of the at least one of the data packets with the prestored unique identifier, the cloud 106 may validate the data packet from the plurality of data packets. Further, the cloud 106 may determine the first device **102-*n* corresponding to the valid data packet. The cloud 106 may transmit a trigger signal along with the unique identifier of the first device 102-*n* corresponding to the valid data packet directly to the second device 108. The second device 108, on receiving the trigger signal, switches ON to transmit and receive communication from the first device 102. Moreover, the validation of the data packets may be performed at the cloud 106 itself, due to which the processing, memory and battery of the sensor unit 104 may be saved to a great extent. Further, the second device 108 may remain switched ON for only a particular session on receiving a trigger signal from the second device 108. Therefore, the lifetime of battery powered second device 108 may be extended for longer duration and there may not be any requirement for frequent changing of the battery of either the sensor unit 104 or the second device 108. Though, the sensor unit 104 is in ON condition for entire duration of time, but as the sensor unit 104 consumes very low power as compared to the second device 108, the battery drainage of the sensor unit 104 is low. Therefore, the battery life of the sensor unit 108** may be longer.

In an embodiment, if none of the data packets received at the sensor unit 104 or the cloud 106 is valid, the sensor unit 104 and/or the cloud 106 may not validate the received data packet. Thus, on invalidation of the data packet, the second device 108 may not receive any trigger signal from either the sensor unit 104 or the cloud 106. Thus, the second device 108 may continue to remain in low power mode or OFF mode without establishing any communication with any of the first devices 102.

The plurality of first devices, the sensor unit and the second device, the cloud may be communicably coupled with each other as discussed above.

Thus, the present invention results in improved battery performance and the battery powered devices may not be required to change their battery frequently, it may be economical as well as easy to replace the sensor unit. Also, the sensor unit, if required may be replaced easily being an independent device with low power consumption as compared to replacement of the second device. Also, no manual intervention may be required to trigger the second device. Also, the second device may not be required to broadcast advertisements or beacon signals continuously to establish communication with the wireless devices such as the first device directly.

Figure 2:
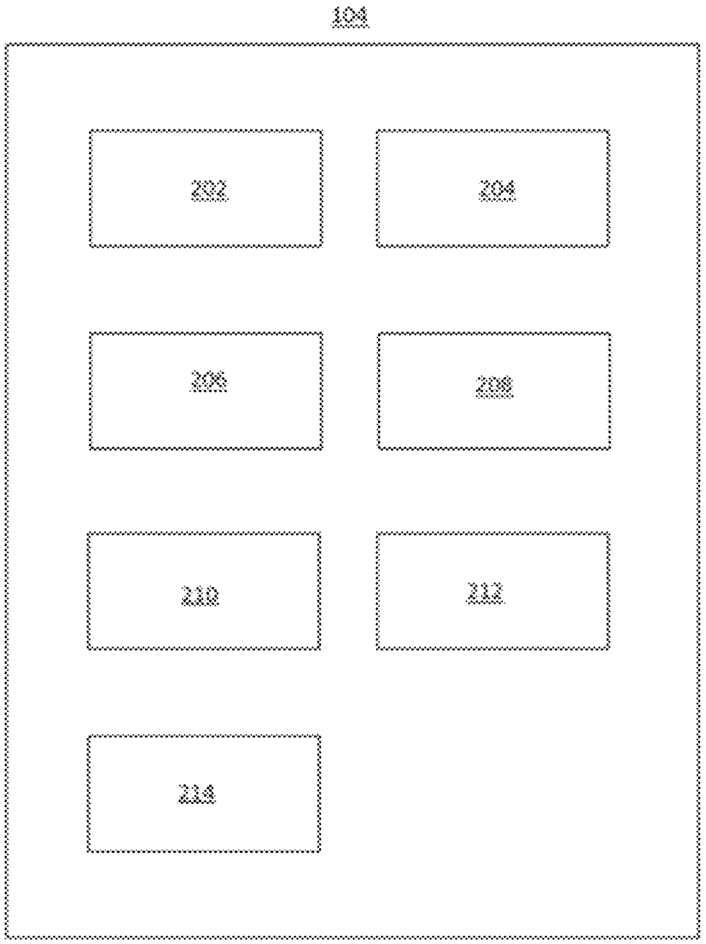
FIG. 2 depicts an exemplary block diagram of a sensor device in accordance with the invention of the present application.

FIG. 2 illustrates a block diagram of the sensor unit 104. The sensor unit 104 comprises a transmitter 202, a receiver 204, a processor 206, a memory 208, a communication module 210, a validation unit 212 and a battery module 214. The sensor unit 104 may remain ON continuously, until manually switched OFF, to receive plurality of the data packets transmitted by the plurality of first devices 102. The sensor unit 104 is a small independent device, placed near to the second device 108, that may interact with the plurality of first devices 102 and the second device 108 and may consume very low power as compared to the second device 108, in spite of being in the ON state. The sensor unit 104 may receive the plurality of data packets transmitted by the plurality of first devices 102 at the receiver 204 of the sensor unit 104. On receiving the plurality of data packets, the sensor unit 104 may validate the plurality of data packets using the validation unit 212. The validation at the sensor unit 104 may be performed by matching the pre-stored unique identifier stored in the memory 208 with the received unique identifier of the first device using the processor 206. On validating, the data packet from the plurality of data packets, the sensor unit 104 may transmit the trigger signal and the unique identifier of the valid data packet, using the transmitter 202, to the second device 108 by the communication module 210. The communication module 210 facilitates transmission of the trigger signals and the unique identifiers from the sensor unit 104 to the second device 108. The sensor unit having the battery module 214 may consume less energy as compared to a battery module in the second device 108.

In a different embodiment, the validation of the data packets may be performed at the cloud. In that case the transmitter 202 of the sensing unit 104 is configured to transmit the one or more data packets to cloud for validation as discussed above in FIG. 1.

In yet another embodiment, the validation of the data packet may be performed at the cloud and the transmitter 202 is configured to transmit the one or more data packets for validation. After validation of the data packet, the cloud may transmit the unique identifier of the valid data packet and the receiver 204 receives the valid data packet and the unique identifier to the sensor unit 104. The sensor unit may further transmit the trigger signal as well as the unique identifier of the valid data packet to the second device 108 using the transmitter 202.

The second device 108, on receiving the trigger signal and the unique identifier associated with the first device 102-*n*, may establish communication for a session with the first device by exchanging electronic handshake signals. Due to exchange of handshaking signals between the second device 108 and the first device 102, the second device 108 may be opened to access key inside the second device. Thus, the second device 108 may directly send and receive data to the first device 102-*n* thereby resulting in faster information exchange during the session. At the completion of the session, the second device switches back to low power mode or OFF state.

Figure 3:
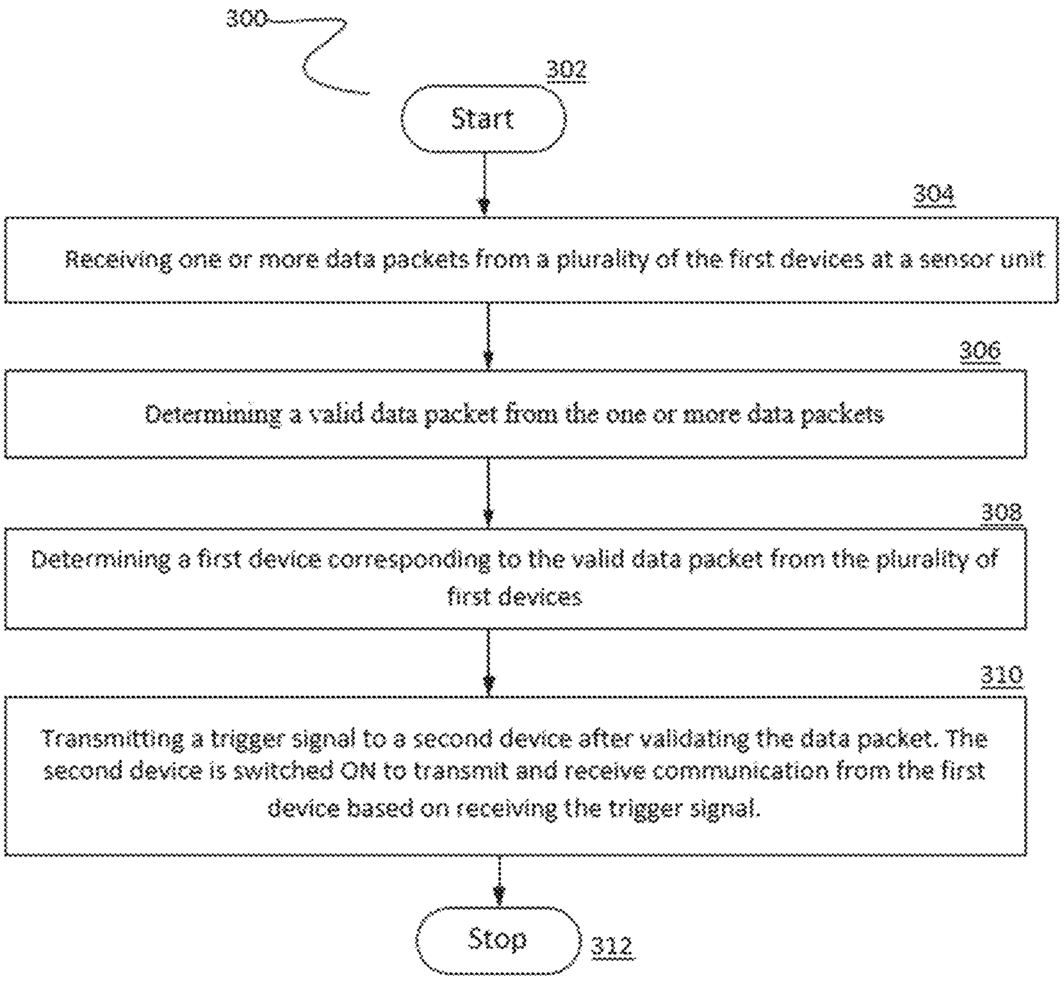
FIG. 3 depicts a flow diagram of the system in accordance with the invention of the present application.

FIG. 3 is an exemplary flowchart illustrating a method 300 to perform the invention. In some embodiments, a method comprises a step 304 for receiving one or more data packets from the plurality of first devices 102 at the sensor unit 104. The method comprises a step 306 of determining the valid data packet from the one or more data packets. The method further comprises a step 308 of determining the first device 102-*n* corresponding to the valid data packet from the plurality of first devices 102. The method also comprises a step 310 of transmitting the trigger signal to the second device 108 after validating the data packet. The second device 108 is switched ON to transmit and receive communication from the first device 102-*n* based on receiving the trigger signal. The features of the invention for the different method steps are already described in detail with respect to FIG. 1. Various other features described above in FIG. 1 and FIG. 2 are part of the method of performing the invention and are not described herein to maintain brevity.

The present invention is applicable in any industry/field that is well known in the art and where an equipment is utilized. The embodiments of the invention discussed herein are exemplary and various modifications and alterations to a person skilled in the art are within the scope of the invention.

In one embodiment of the invention, the invention can be operated using the one or more computer readable devices. The one or more computer readable devices can be associated with a system 100. A computer readable medium comprises one or more processors and a memory coupled to the one or more processors, the memory stores instructions executed by the one or more processors. The one or more processors are configured to receive one or more data packets from a plurality of first devices 102 at a sensor unit 104. The one or more processors are configured to determine a valid data packet from the one or more data packets. The one or more processors are configured to determine a first device 102-*n* corresponding to the valid data packet from the plurality of first devices 102. The one or more processors are configured to transmit a trigger signal to a second device 108 after validating the data packet, wherein the second device 108 is switched ON to transmit and receive communication from the first device 102-*n* based on receiving the trigger signal.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purposes or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:

receiving one or more data packets from a plurality of first devices at a sensor unit;

determining a valid data packet from the one or more data packets;

determining a first device corresponding to the valid data packet from the plurality of first devices;

transmitting a trigger signal to a second device after validating the data packet, wherein the second device is a battery powered device that is switched to an ON state to transmit and receive communication from the first device during a communication session based on receiving the trigger signal; and switching the second device from the ON state to a low power mode or an OFF state responsive to completion of the communication session.

2. The method of claim 1, wherein the plurality of first devices, the sensor unit and the second device are communicably coupled with each other.

3. The method of claim 1, wherein each of the one or more data packets comprises a unique identifier indicating an identity of each of the first devices.

4. The method of claim 3, wherein the sensor unit determines the valid data packet by matching the unique identifier of the first device with a prestored unique identifier.

5. The method of claim 4, wherein the sensor unit transmits the trigger signal and the unique identifier of the first device to the second device on determining the valid data packet.

6. The method of claim 3, wherein the sensor unit transmits the one or more data packets to a cloud, wherein the cloud determines the valid data packet and the corresponding first device by matching the unique identifier of the first device with a prestored unique identifier, wherein the cloud transmits the unique identifier of the first device to the sensor unit, and the sensor unit transmits the trigger signal and the unique identifier of the first device to the second device.

7. The method of claim 1, wherein on invalidation of the one or more data packets, no trigger signal is transmitted to the second device.

8. A system comprising:

a plurality of first devices, each configured to transmit a data packet;

a sensor unit configured to:

receive one or more data packets from the plurality of first devices;

determine a valid data packet from the one or more data packets;

determine a first device corresponding to the valid data packet from the plurality of first devices;

transmit a trigger signal after validating the data packet; and a second device configured to:

receive the trigger signal from the sensor unit, wherein the second device is a battery powered device that is switched to an ON state to transmit and receive communication from the first device during a communication session based on receiving the trigger signal; and switch from the ON state to a low power state or an OFF state responsive to completion of the communication session.

9. The system of claim 8, wherein the plurality of first devices, the sensor unit and the second device are communicably coupled with each other.

10. The system of claim 8, wherein each of the one or more data packets comprises a unique identifier indicating an identity of each of the first devices.

11. The system of claim 10, wherein the sensor unit determines the valid data packet by matching the unique identifier of the first device with a pre stored unique identifier.

12. The system of claim 11, wherein the sensor unit transmits the trigger signal and the unique identifier of the first device to the second device on determining the valid data packet.

13. The system of claim 10, wherein the sensor unit transmits the one or more data packets to a cloud, wherein the cloud determines the valid data packet and the corresponding first device by matching the unique identifier of the first device with a prestored unique identifier, wherein the cloud transmits the unique identifier of the first device to the sensor unit, and the sensor unit transmits the trigger signal and the unique identifier of the first device to the second device.

14. The system of claim 8, wherein on invalidation of the one or more data packets, no trigger signal is transmitted to the second device.

15. A system comprising:

a plurality of first devices, each configured to transmit a data packet;

a sensor unit configured to:

receive one or more data packets from the plurality of first devices, wherein each of the one or more data packets comprises a unique identifier indicating an identity of each of the first device; and transmit each of the one or more data packets to a cloud device;

the cloud device configured to:

receive each of the one or more data packets from the sensor unit;

determine a valid data packet from the one or more data packets by matching the unique identifier of the first device with a prestored unique identifier;

determine a first device corresponding to the valid data packet from the plurality of first devices; and transmit a trigger signal and the unique identifier of the first device to a second device after validating the data packet; and wherein the second device is configured to receive the trigger signal from the cloud, wherein the second device is switched ON to transmit and receive communication from the first device based on receiving the trigger signal.

16. The system of claim 15, wherein the plurality of first devices, the sensor unit and the second device are communicably coupled with each other.

17. The system of claim 15, wherein the second device is a battery powered device.

18. A non-transitory computer readable medium comprising a memory storing instructions executed by one or more processors, the one or more processors configured to:

receive one or more data packets from a plurality of first devices at a sensor unit;

determine a valid data packet from the one or more data packets;

determine a first device corresponding to the valid data packet from the plurality of first devices;

transmit a trigger signal to a second device after validating the data packet, wherein the second device is a battery powered device that is switched to an ON state to transmit and receive communication from the first device based on receiving the trigger signal; and switch the second device from the ON state to a low power state or an OFF state responsive to completion of the communication session.

* * * * *